W. WILLIAMS.
APPARATUS FOR MANUFACTURING INGOTS, BARS, AND THE LIKE IN ROLLING MILLS.
APPLICATION FILED JAN. 19, 1918.
1,340,129. Patented May 11, 1920.
4 SHEETS—SHEET 1.
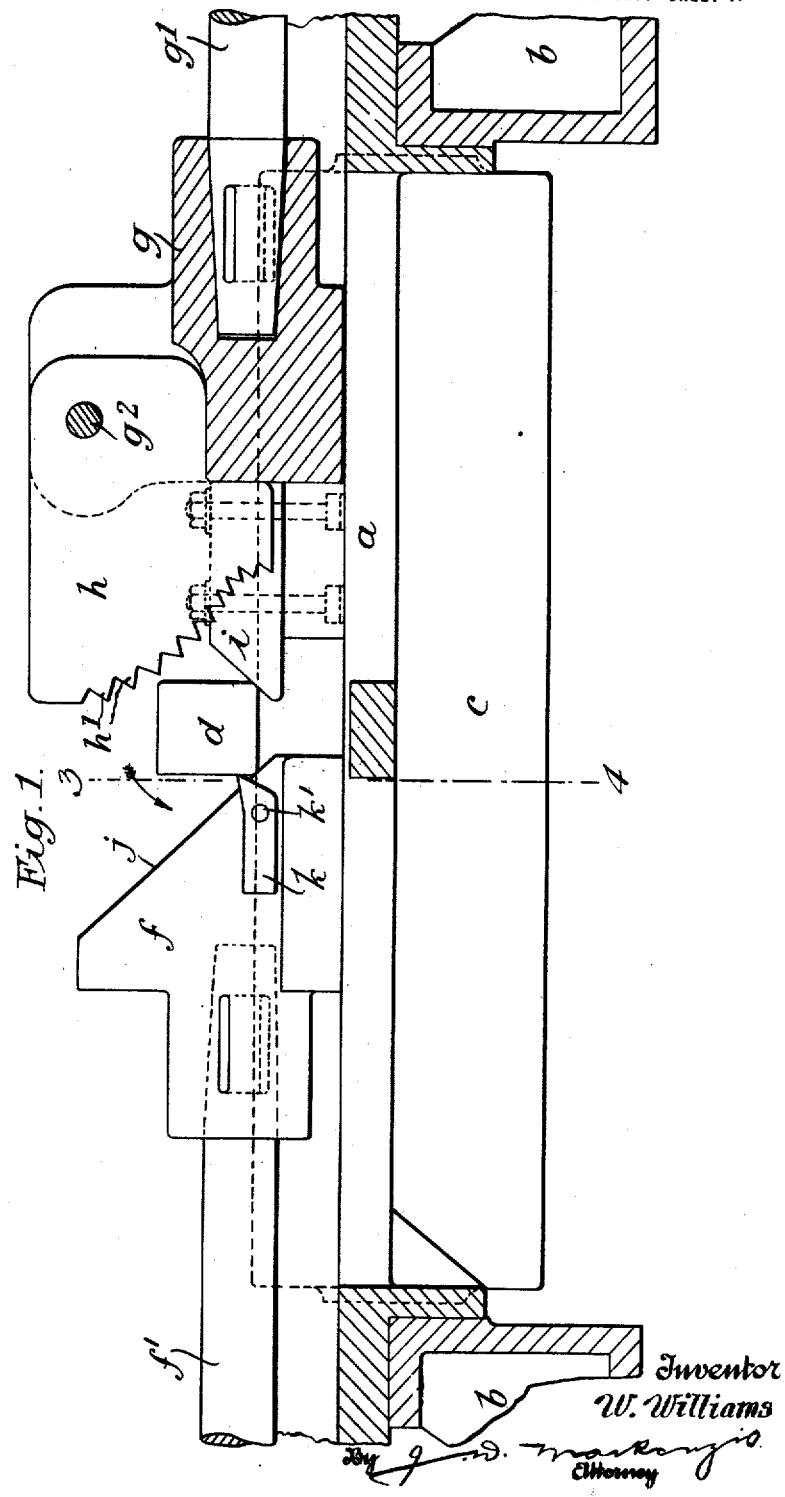
Inventor
W. Williams

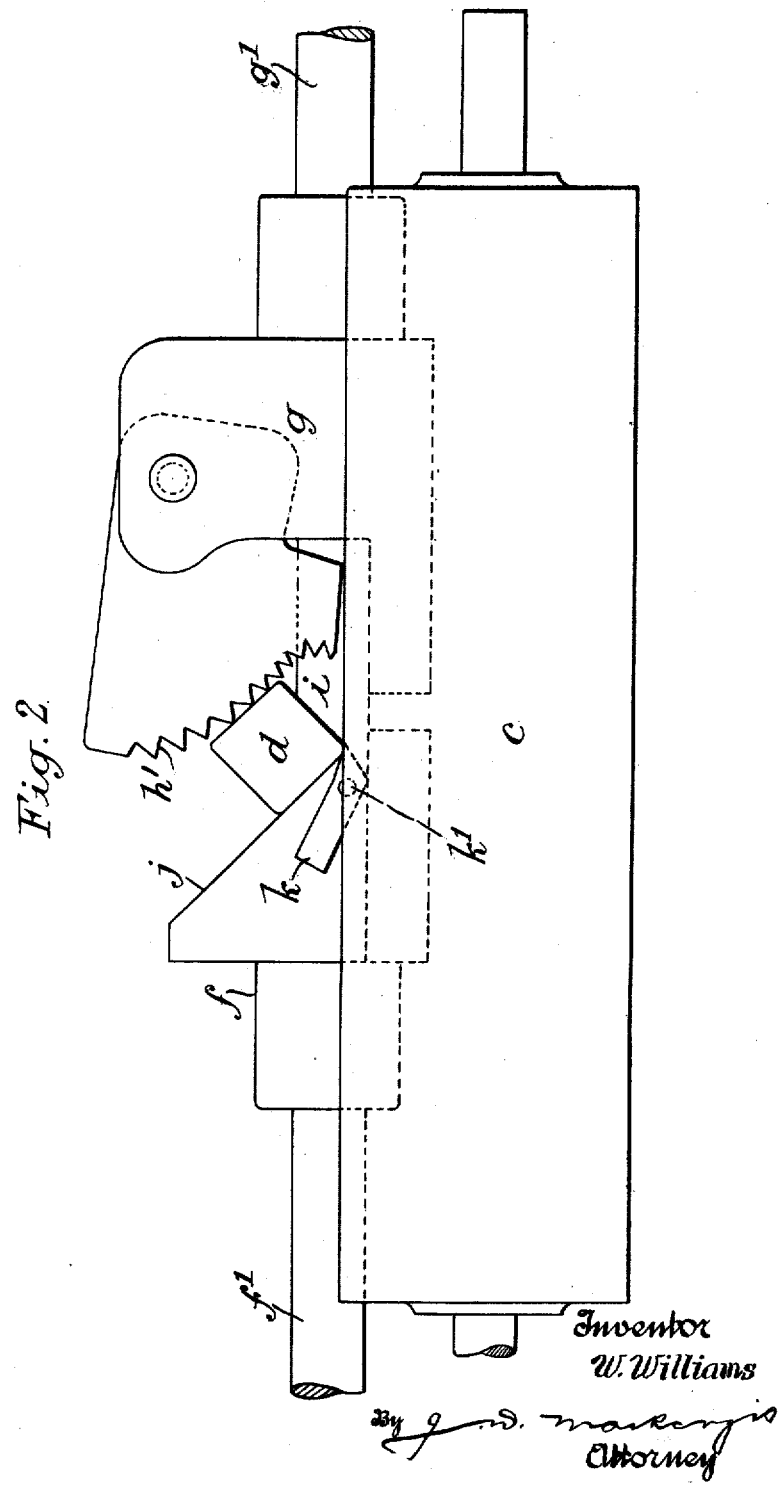

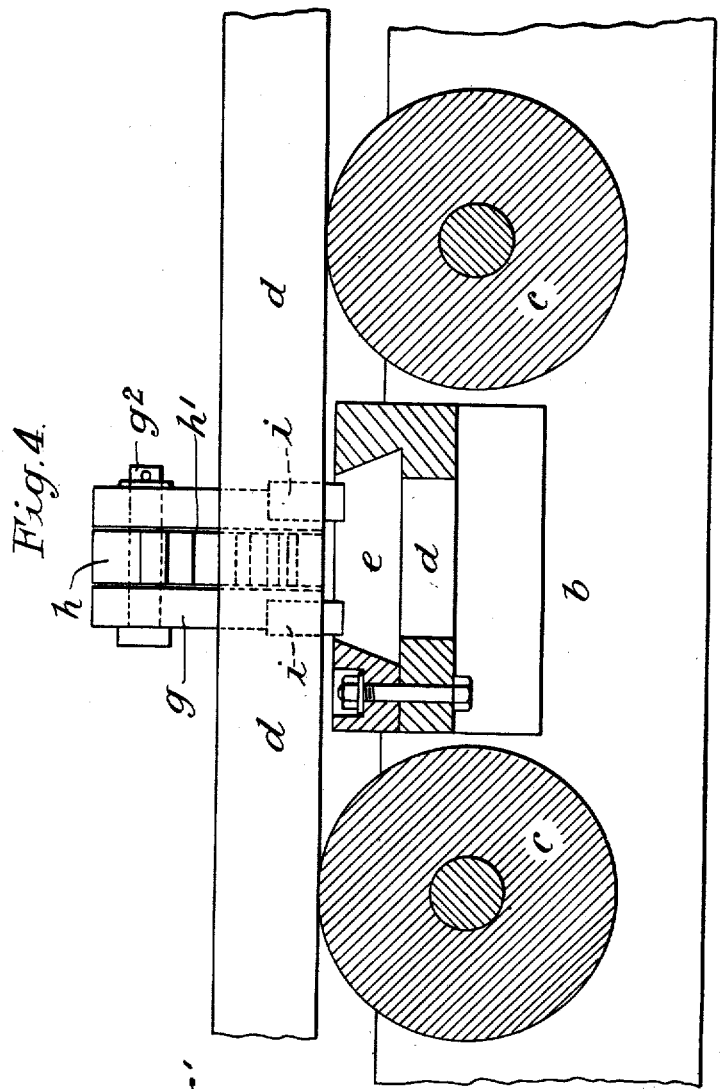

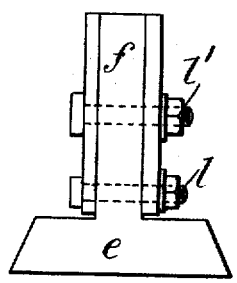
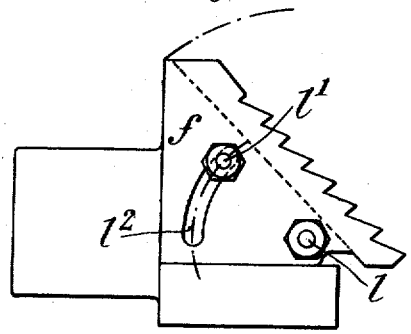
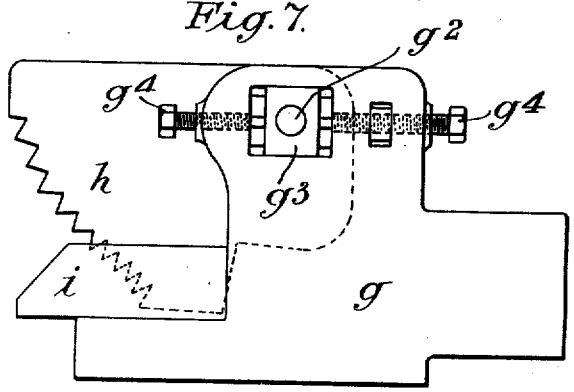
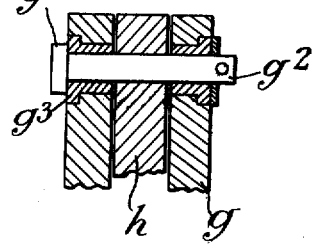

UNITED STATES PATENT OFFICE.

WILLIAM WILLIAMS, OF GILWERN, WALES.

APPARATUS FOR MANIPULATING INGOTS, BARS, AND THE LIKE IN ROLLING-MILLS.

1,340,129.  Specification of Letters Patent.  Patented May 11, 1920.

Application filed January 19, 1918. Serial No. 212,832.

*To all whom it may concern:*

Be it known that I, WILLIAM WILLIAMS, a subject of the King of Great Britain and Ireland, whose post-office address is "Brynteg," Gilwern, county of Breconshire, Wales, have invented certain new and useful Improvements in Apparatus for Manipulating Ingots, Bars, and the like in Rolling-Mills, of which the following is a specification.

This invention relates to apparatus for turning over and otherwise manipulating ingots, blooms, billets, bars and the like in rolling mills by means of opposed abutment and turning heads movable by hydraulic pressure or other means in rectilineal guides transversely to the direction of feed of the work and has for its object to enable the work to be readily turned over or presented edgewise to the rolls or otherwise moved as required for rolling purposes.

According to this invention the turning head is provided with lower rigid jaw members or wedges and an upper overhanging pivoted jaw member coöperating therewith to impart a turning movement to the work about the longitudinal axis thereof the other head being held stationary during the initial part of the turning movement and serving as an abutment for the work. By this means a bar for example of rectangular section may be turned on one edge and guided to the rolls in that position or by drawing back the abutment head, and by further advancing the other head, a turning of the bar through an angle of 90° may be effected.

The abutment head is so shaped that it presents an upwardly inclined face to the work and may be provided with adjustable toothed or serrated cheek portions or pivoted fingers intended to prevent the work from sliding up the said inclined face of the head.

Means are also provided for adjusting the abutment head to insure effective engagement of the teeth on the work.

Both the manipulator heads are guided in a suitable guide bed fixed on the framing of the roller table over which the bars are fed to the rolls of the mill.

The invention is hereinafter described with reference to the accompanying drawings in which—

Figure 1 is a transverse section through the framing of the roller table of a rolling mill showing the manipulator applied thereto.

Fig. 2 is an elevation of the manipulator in the act of turning a bar on the roller table.

Figs. 3 and 4 are sections at right angles to Figs. 1 and 2 looking in opposite directions from the line 3—4 between the two manipulator heads.

Figs. 5 and 6 are elevations at right angles illustrating a slightly modified form of construction of one of the manipulator heads.

Figs. 7 and 8 are elevation and part cross section respectively illustrating a slightly modified construction of the other head.

As shown in Figs. 1 to 4 a guide bed or table $a$ for the manipulating apparatus is supported upon the frame $b$ upon which are also mounted the rollers $c$ for carrying the work $d$ into the mill. In the guide bed or table $a$ a dovetail guide groove is formed for the reception of corresponding slides $e$ on the manipulator heads $f\ g$, the said heads being connected by rods $f^1\ g^1$ with pistons working in hydraulic cylinders (not shown) whereby they can be reciprocated in their guides to have pressure applied through them to the work $d$.

On the head $g$ is pivotally mounted on a pin $g^2$ an upper jaw $h$ having a toothed overhanging surface $h^1$ adapted to engage the work $d$, and bolted to the head on each side of the said jaw is a lower jaw or wedge member $i$ so arranged that, on the head $g$ being advanced, the wedges $i$ pass under the work tilting it (as shown) about the opposite lower corner until the upper jaw $h$ engages the work and brings the same into the position shown in Fig. 2. In this position the bar is held on one edge but is not tightly gripped, so that it is free to slide longitudinally between the jaws as it is fed over the roller table to the rolls. Head $f$ has an upwardly inclined face $j$ and forms an abutment for the work during the turning operation, fingers $k$ being pivoted at $k^1$ on the head $f$, in some cases, to prevent the work riding up the inclined face $j$. These fingers are however only required when turning bars of irregular section.

By withdrawing the head $f$ and further advancing the head $g$ the turning movement is completed.

In some cases, when rolling certain sections, it is found advantageous to be able to vary the angle of the inclined face $j$ of the head $f$. A convenient way of doing this is illustrated in Figs. 5 and 6.

The part of the head against which the work bears is made adjustable being pivotally mounted on a bolt or pin $l$ and fixed after adjustment by a bolt $l^1$ working in arcuate slots $l^2$.

Teeth are also provided on the inclined part of the head to prevent the work from sliding thereover.

To further facilitate the manipulation of some sections it is likewise advisable to provide for the adjustment of the upper jaw $h$ in the head $g$ in relation to the wedge or lower jaw members $i$. For this purpose the pivot pin $g^2$ of the jaw is mounted as shown in Figs. 7 and 8 in sliding bushes or bearings $g^3$ and four adjusting screws $g^4$ are provided to position the bearings as required.

What applicant claims and desires to secure by Letters Patent is:—

1. An apparatus for manipulating ingots, bars and the like in rolling mills comprising a pair of manipulator heads mounted to slide in rectilineal guides transversely to the direction of feed of the work, one of said heads serving as an abutment during the turning operation while the other or turning head is provided with lower rigidly fixed jaw members and an upper overhanging pivoted jaw member coöperating therewith to turn the work on edge and with the aid of the abutment head hold and guide it to the rolls in that position or to complete the turning movement when required, substantially as described.

2. An apparatus for manipulating ingots, bars and the like in rolling mills according to claim 1 wherein one manipulator head has a toothed overhanging upper jaw pivoted thereon and fixed lower jaws formed by wedge members arranged on opposite sides of the pivoted jaw substantially as described.

3. An apparatus for manipulating ingots, bars and the like in rolling mills according to claim 1, in which the head serving as an abutment for the work during the turning operation has an upwardly inclined face and is provided with means for preventing the work from riding up the inclined face substantially as described.

4. An apparatus for manipulating ingots, bars and the like in rolling mills comprising two manipulator heads as set forth with members adapted to engage under and over the work one of said members being constituted by an overhanging jaw pivoted in adjustable bearings substantially as and for the purpose described.

In testimony whereof I have affixed my signature in presence of two witnesses.

WILLIAM WILLIAMS.

Witnesses:
W. SCOTT,
WILLIAM PARTRIDGE.